Dec. 2, 1952    A. J. HAMMOND    2,620,204
FENDER SHIELD
Filed June 20, 1950

Inventor
Almerton J. Hammond
By
Willits, Helmig & Baillio
Attorneys

Patented Dec. 2, 1952

2,620,204

UNITED STATES PATENT OFFICE 2,620,204

FENDER SHIELD

Almerion J. Hammond, Lansing, Mich., assignor to General Motors Corporation, Detroit, Mich., a corporation of Delaware Application June 20, 1950, Serial No. 169,225

10 Claims. (Cl. 280—153)

1

This invention relates generally to closure members for openings and has particular relation to fender shields to be employed for closing or partially closing the wheel openings in the rear fenders of automobiles.

An object of the invention is to provide a simple and inexpensive closure member which will be easy to install and to remove, which will remain securely in place at all times during service, which will not rattle or make other undesirable noises, which will flush fit an opening in a wall with which it is employed, which will be resiliently held in place after the installation thereof, and which may be mounted by rotational movement of the member from supports for the member and by the utilization of cam means which also is employed for securing the member in position.

For a better understanding of the invention, reference may now be had to the accompanying drawing forming a part of this specification, in which:

Figure 2 is taken in the plane of line 2—2 of Figure 1.

Figure 3 also illustrates a dot-and-dash line position of a fender shield and in which position the fender shield is disposed when being installed.

Figure 4 is taken substantially in the plane of line 4—4 on Figure 1, looking in the direction of the arrows thereon.

Figure 5 is taken in the plane of line 5—5 on Figure 2, looking in the direction of the arrows thereon.

Figure 1:
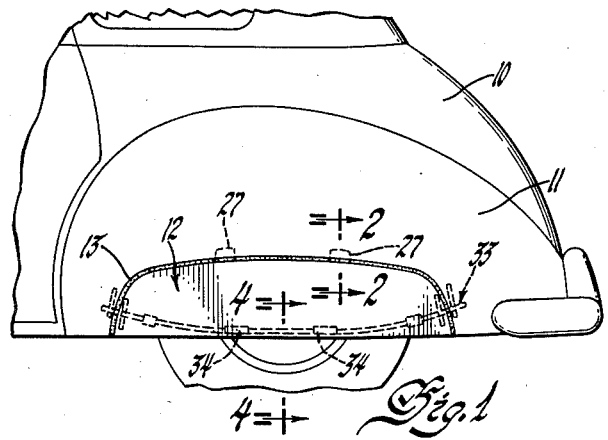
Figure 1 is a fragmentary view of the rear end of an automobile having a fender in which a fender shield embracing the principles of the invention is employed.
Figure 2:
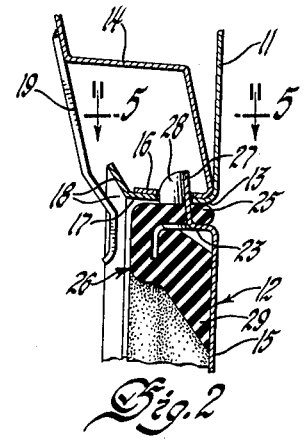
Figure 2 is a fragmentary vertical sectional view illustrating the tongue and slot means which is employed in securing the fender and fender shield structure together so that the exterior surfaces thereof will appear to be substantially continuous.

Figure 1 illustrates the rear end of an automobile 10 having a fender 11 in which a fender skirt or closure member 12 is employed for closing a wheel opening indicated at 13.

The inside of the fender 11 is secured against a wheel housing 14 which is provided with an inwardly turned flange 16 extending along the upper part of the opening 13. The fender 11 has an inwardly projecting flange 17 engaging the flange 16 and extending all the way around the opening 13. The upper part of the flange 17 is further extended inwardly and upwardly by an angularly disposed flange indicated at 18.

The wheel housing 14 has a pair of supports 19 secured thereto in spaced relation to one another and projecting downwardly into the upper part of the opening 13 and behind and in spaced relation to the upper part of the closure 12.

The fender shield 12 comprises a wall or closure member 15 having an outside surface formed to provide a continuation of the outside surface of the fender 11. The shield 12 also is adapted to project within and to flush fit the opening 13 in the fender 11.

In order to increase the rigidity of the shield 12 and for other purposes to be hereinafter explained, the shield 12 is provided around the upper and lower edge portions thereof with a relatively continuous flange, the lower part of which is indicated at 21. The two end parts of the flange are indicated at 22 and the upper part at 23. The upper part 23 of the flange has a downwardly or inwardly projecting part indicated at 24 which curves at the ends of the shield 12 and with the flange 23 and terminates at the upper extremities of the end flanges 22.

In order to provide for resiliently mounting the shield 12 in the opening 13, the flanges 22 and 23 are spaced throughout the opening 13 a relatively uniform distance from the fender flange 17 to provide for receiving a part 25 of a rubber strip or a gasket indicated generally at 26.

At an upper intermediate part of the shield 12 the two flanges 24 and 23 are sheared in such a way as to provide spaced tongues indicated at 27, the tongues 27 being turned upwardly and outwardly in opposed relation to the flange 24. Each of the tongues 27 is curved about axes disposed in parallel relation inside the skirt 12, and inwardly with respect to the skirt 12. The curvature of the tongues 27 therefore is in convex relation to the outside surface of the skirt 12 and chordal planes extending across the tongues therefore are disposed inside but substantially parallel to the outside surface of the skirt 12.

The tongues 27 also are formed with a curve configuration at the upper extremities thereof to provide cam surfaces indicated at 28. The cam surfaces 28 are formed by curving the upper ends of the tongues 27 away from the middle portions of the tongues and downwardly toward the edges thereof. The cams 28 therefore are curved away from the exterior surface of the fender 11 and the skirt 12.

The gasket 26 has a part 29 which extends around the flange 24 and into engagement with the inside surface of the skirt 12. By being formed to fit the interior and exterior surfaces of the flanges 23 and 24, the gasket 26 will resiliently retain itself in position with respect to skirt 12 when once assembled upon the flanges 23 and 24. However, the gasket 26 extends downwardly at the ends of the shield 12 and beyond the ends of the flange 24 where the gasket is held in position by means hereinafter to be described.

The tongues 27 are adapted to be received in elongated openings indicated at 31, these openings being formed and being aligned and extending through the fender and wheel housing flanges 17 and 16 respectively. The tongues 27 and the openings 31 are spaced inwardly with respect to the outside surfaces of the fender 11 and the shield 12 and extend substantially in parallel relation to such outside surfaces.

The lower extremities of the supports 19 are spaced from the adjacent surfaces of the gasket 26 when the fender shield is in normal operative position with respect to the fender 11. The spacing of such ends is such that the gasket 26 may be rested against the lower ends of the supports 19 when the shield 12 is being installed in the fender opening 13. When so disposed against the supports 19, the cam surfaces 28 will be located in such position with respect to the opening 31 that upward pressure upon the shield 12 will cause the tongues 27 to cam into the openings 31 by sliding movement between the cam surfaces 28 and the adjacent edges of the openings 31. The shield thereupon will move outwardly away from the supports 19 and into alignment with the outside surface of the fender 11 by reason of the biasing movement caused by the cam surfaces 28.

The tongues 27 are adapted to be resiliently held in the openings 31 and the gasket 26 is adapted to be compressed between the flanges 17 and 23 of the fender and fender shield respectively by a resilient fastening means which is indicated generally by the numeral 33. The fastening means 33 comprises a spring rod 32 secured intermediate the opposite ends thereof to an extension portion of the flange 21 by spaced brackets or plates 34 which are welded or otherwise secured to the flange 21. The rod 32 extends behind the shield 12 substantially in parallel relation to the front surface thereof and the ends of the rod project beyond the ends of the shield and through elongated openings 37 which are formed in guides indicated by the numerals 36. The openings 37 in the guides 36 have parallel opposite edges disposed in planes substantially parallel with the front surface of the shield 12 and which slidably engage the opposite sides of the ends of the rod 32. This engagement of the parallel sides of the openings 37 with the opposite sides of the ends of the rods 32 prevents any lateral or rattling movement between the shield 12 and the ends of the rod 32. The guides 36 are secured by welding or other suitable means to the end flanges 22 of the shield 12 and in such position that the lower ends of the openings 37 are positioned substantially above and away from the flange 21 to which the intermediate portions of the rod 32 are secured by plates 34. The brackets or guides 36 therefore bend the opposite ends of the rod 32 upwardly and away from the flange 21 and in parallel relation to the front of the shield 12. When the shield 12 is detached from the fender of an automobile, the ends of rods 32 therefore will be supported by the lower ends of the openings 37 in the guides 36.

It will be apparent also that the ends of the rods 32 project beyond the brackets 36 and in such position as to hold the lower extremities of the gasket 26 in position upon the parts of the end flanges 22. Also, the end extremities of the gasket 26 are slotted in such way as to receive the guides 36 and these slots also tend to hold the gasket in position at the ends of the shield.

The ends of the rod 32 are adapted to project beyond the guides 36 and into engagement with latches 38 which are welded or otherwise secured to the inwardly turned flanges 17 of the fender 11. The latches 38 are positioned with respect to the guides 36 in such manner that the latches will hold the ends of the rods 32 in further deflected positions and at approximately the central parts of the elongated openings 37, whenever the shields 12 are disposed in operative position within the openings 13. The latches 38 are formed in such a way as to provide inwardly disposed notches 39 which are formed at the upper and lower extremities thereof and these notches are adapted to receive and to hold the ends of the rod 32 in such manner as to prevent movement laterally of the ends of the rod when the fender shield 12 is installed. The two notches 39 are provided in each of the latches 38 merely so that similar latches can be used at each end of the fender opening 13.

Figure 3:
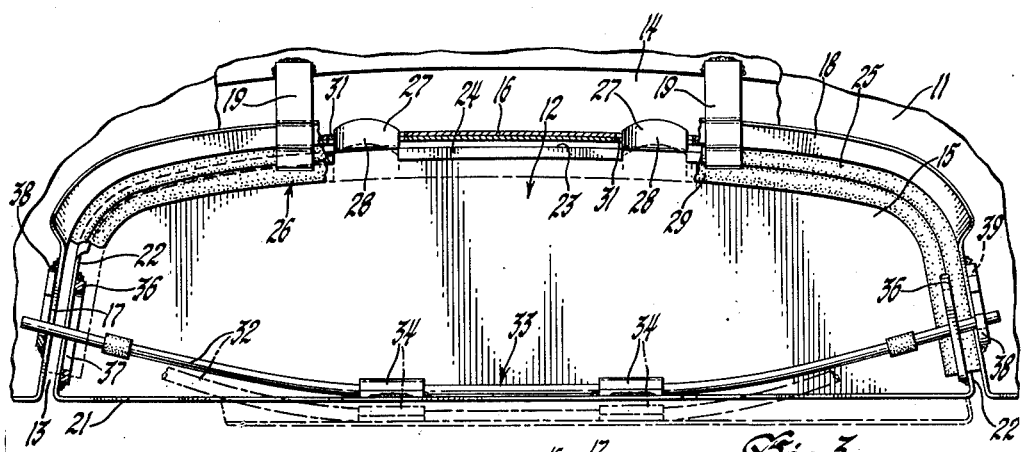
Figure 3 is a fragmentary view illustrating a fender and fender shield structure from the inside.
Figure 4:
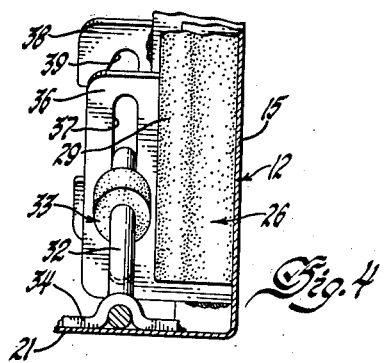
Figure 4 is a fragmentary transverse sectional view through the lower part of the fender shield illustrated by the preceding figures.
Figure 6:
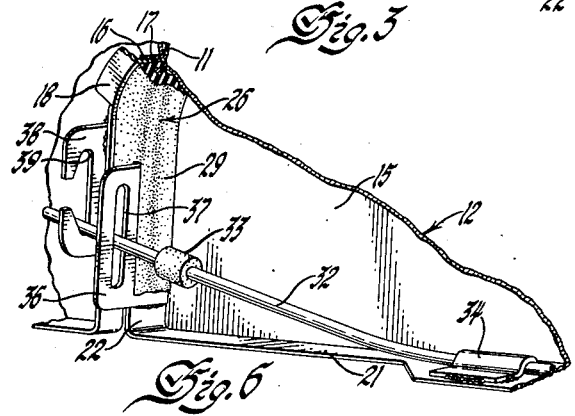
Figure 6 is a fragmentary perspective view taken from inside the fender shield and illustrating a part of the spring latch mechanism employed in holding the lower part of the fender shield in position within the fender opening.
Figure 5:
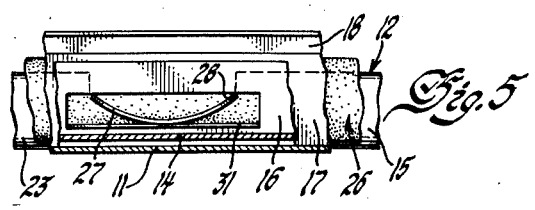
Figure 5 is a fragmentary horizontal sectional view illustrating the tongue and slot mechanism employed in securing the upper part of the fender shield in place.

In order to install a fender shield in an opening in a fender, it is necessary only to insert the lower part of the shield in the opening 13 far enough so that the ends of the rod 32 can be engaged in the latches 38. When this is done, it is necessary only to pull downwardly on the shield until the shield is in dot-and-dash line position indicated in Figure 3 and to move the top of the shield inwardly until it rests against the supports 19. Thereafter the cam surfaces 28 will move the shield into position in response to the operation of the rod ends 32 within the openings 37.

I claim:

1. A fender shield for automobiles comprising an inwardly flanged closure member adapted to extend within and to flush fit the wheel opening of an inwardly flanged fender of an automobile, said shield comprising tongue means extending from the top of said shield and adapted to project within and to fit an opening formed in said fender, a spring rod secured intermediate the ends thereof to the lower part of said shield upon the inside of said shield and projecting beyond the ends of said shield in parallel relation to the outside of said shield, guide means projecting laterally from the opposite ends of said shield and being provided with elongated openings therein for receiving the opposite ends of said rod, said openings having parallel edges disposed in sliding engagement with said rod ends and being formed in planes parallel to the outside of said shield and having ends for limiting engagement with said rod ends, said means being positioned to bend said rods in planes parallel to the plane of said shield and to permit and to limit the further bending movement of said rod ends in planes parallel to the plane of said shield, the ends of said rods being adapted to be received in latch means formed inwardly of said fender and beyond said openings in said guide means and intermediate said ends of said openings.

2. A fender shield for automobiles comprising a closure member adapted to close part of the wheel opening in the fender of an automobile, said shield and said fender having tongue and slot means formed therein adjacent the upper part of said shield, a spring rod secured intermediate the ends thereof to the lower part of said shield, said rod being positioned inside said shield and substantially parallel thereto and having the ends thereof positioned to engage latch means projecting from said fender, guide means for the opposite ends of said rod, said guide means being secured to the ends of said shield in such position as normally to bend the ends of said rod and being formed to provide parallel edges for guiding the further bending movement of said ends.

3. A fender shield comprising a closure member for closing an opening in the fender of an automobile, said shield comprising resilient means secured to the lower part of said shield and being adapted to engage a part of said fender for urging said shield upwardly within said opening and for preventing lateral movement of said shield, and a tongue projecting upwardly from said shield, said tongue having an arcuate contour extending crosswise of said tongue and being disposed in parallel relation to said shield and having an end portion formed to slope downwardly from the middle of said tongue toward the opposite edges thereof, said tongue being adapted to be received in an opening formed in said fender for securing the upper part of said shield in position within said fender opening, said upper end of said tongue being adapted to act as a cam for guiding said tongue into said opening.

4. A fender shield comprising a closure member having inwardly turned flanges formed around the edges thereof, said shield being adapted to be received in a wheel opening in the fender of an automobile, a spring rod secured to one of said flanges adjacent the lower edge of said shield and having the ends thereof normally bent upwardly in planes parallel to said shield, guide means having elongated openings therein for receiving the ends of said rod, said guide means being secured to said flanges adjacent the opposite ends of said shield, said openings being adapted to guide the further bending movement of said ends of said rod in planes parallel to said shield, and tongue means formed in said inwardly bent flange along the upper edge of said shield, said tongue means being formed at the edges thereof to provide cam means for guiding said tongue means into securing slot means formed in said fender.

5. A closure device comprising a wall member having a spring rod secured thereto with the ends of said rod projecting in opposite directions for engaging latch means, guide means secured to said closure adjacent the ends of said rod and out of alignment with said rod for bending said ends and for guiding the bending movement of said ends in planes parallel to said wall member, and a tongue secured to said wall member and projecting from said wall member in perpendicular relation to an intermediate portion of said rod and being curved about an axis perpendicular to said rod and parallel to said wall, and said tongue being curved outwardly at the end to provide cam means for guiding said tongue.

6. A closure member comprising a wall member having inwardly projecting flanges formed around the edges thereof and adapted to be received in an opening in a wall to be closed, a spring rod secured intermediate the ends thereof to one of said flanges and adapted to be distorted at its free ends for bending movement in parallel relation to the front of said wall and into engagement with latch means projecting from said wall having said opening, guide means associated with oppositely disposed flanges of said wall member and adjacent the ends of said rod for permitting said movement of said ends in parallel relation to said wall and for preventing lateral movement of said ends, and tongue means formed in another of said flanges and projecting transversely with respect to said rod for securing said wall member with respect to a portion of said wall when said ends of said rod are operatively engaged by latch members associated with different portions of said wall.

7. A closure member having an inwardly turned flange formed along one edge thereof and a spring rod secured to said flange intermediate the ends of said rod, and guide means engaging the opposite ends of said rod and secured to said closure member and positioned to deform said ends of said rod in parallel relation to said closure member and to guide the further deformation movement of said ends of said rod in parallel relation to said closure member.

8. A closure member for a wall having an opening therein and a support adjacent said opening for supporting said closure member adjacent said opening, tongue and slot means associated with said closure member and with said wall and positioned with respect to one another for securing said closure in said opening, said tongue means being formed at the end thereof to provide a cam surface positioned with respect to said wall to guide said closure member away from said support and into operative position with respect to said wall.

9. A closure member comprising a wall member having a laterally and inwardly projecting flange formed along one edge thereof, a portion of said flange being bent outwardly between transverse cuts in said flange to form an outwardly projecting tongue for securing said closure member, said tongue being arcuately formed in the plane of said closure member and being arcuately formed at the end of said tongue from the middle inwardly along the edges thereof to provide a cam surface for operating said closure member.

10. A fender shield comprising a closure member having an inwardly turned flange formed along one edge thereof, a spring rod secured intermediate the ends thereof to a middle portion of said flange and having the ends thereof projecting in opposite directions in parallel relation to the front of said closure member, and a pair of guides secured to said closure member adjacent the opposite ends of said rod, and being positioned out of alignment with said rod for deflecting the ends of said rod in the plane of said closure member and for providing guide means for guiding the further deflection of said ends of said rod in parallel relation to said closure member.

ALMERION J. HAMMOND.

REFERENCES CITED

The following references are of record in the file of this patent:

UNITED STATES PATENTS

| Number | Name | Date |
| --- | --- | --- |
| 2,068,732 | Cadwallader | Jan. 26, 1937 |
| 2,118,256 | Lyon | May 24, 1938 |
| 2,222,619 | Jandus | Nov. 26, 1940 |
| 2,267,421 | Purdy | Dec. 23, 1941 |